Figure 3B:
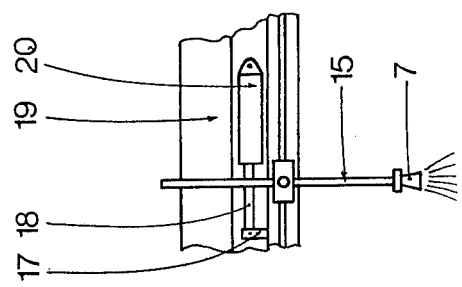

United States Patent [19]

Flix et al.

[11] 4,010,900
[45] Mar. 8, 1977

[54] MOBILE AGRICULTURAL SPRAY MACHINE

[76] Inventors: Jean-Marie Flix, 10600 LaChapelle Saint Luc, Mergey; Guy Payen, 10170 Mery sur Seine, Chauchigny, both of France

[22] Filed: Dec. 24, 1975

[21] Appl. No.: 644,078

[30] Foreign Application Priority Data

Dec. 31, 1974 France .............................. 74.43377
Sept. 10, 1975 France .............................. 75.27678

[52] U.S. Cl. .............................. 239/168; 239/169; 239/172; 172/155; 172/417

[51] Int. Cl.² ...................... B05B 1/20; E01H 3/02; A01B 49/02

[58] Field of Search .................. 239/159, 164–169, 239/172, 176, 175, 177, 212, 186; 172/201, 155, 324, 407, 699, 507, 415, 416, 701, 417; 47/DIG. 10

[56] References Cited

UNITED STATES PATENTS

| 931,030 | 8/1909 | Bowman | 239/169 |
|---|---|---|---|
| 1,043,929 | 11/1912 | Heard | 239/167 |
| 1,159,343 | 11/1915 | Gailor | 239/164 |
| 3,329,030 | 7/1967 | Dijkhof | 239/167 X |
| 3,559,746 | 2/1971 | Couser | 172/417 X |
| 3,588,139 | 6/1971 | Bayne | 172/417 X |

FOREIGN PATENTS OR APPLICATIONS

| 571,548 | 2/1924 | France | 239/164 |
|---|---|---|---|
| 738,568 | 10/1932 | France | 239/164 |
| 1,018,166 | 10/1952 | France | 239/166 |
| 216,136 | 11/1941 | Switzerland | 239/164 |
| 238,095 | 10/1945 | Switzerland | 239/167 |

*Primary Examiner*—Robert S. Ward, Jr.
*Attorney, Agent, or Firm*—George B. Oujevolk

[57] ABSTRACT

An agricultural spraying machine comprising an assembly having at least two moving sections resting on wheels on the soil. This assembly supports at least two spray conduits having spraying nozzles and is attached to a tractor vehicle having a powder feed hopper. According to the inventive concept, the conduits are suspended in the moving section of the assembly and include means to adjust individually the lateral positions of the conduits perpendicular to the direction of movement of the tractor vehicle. Other means likewise provide for the adjustment in height and spacing of the spray nozzles of each conduit.

13 Claims, 7 Drawing Figures

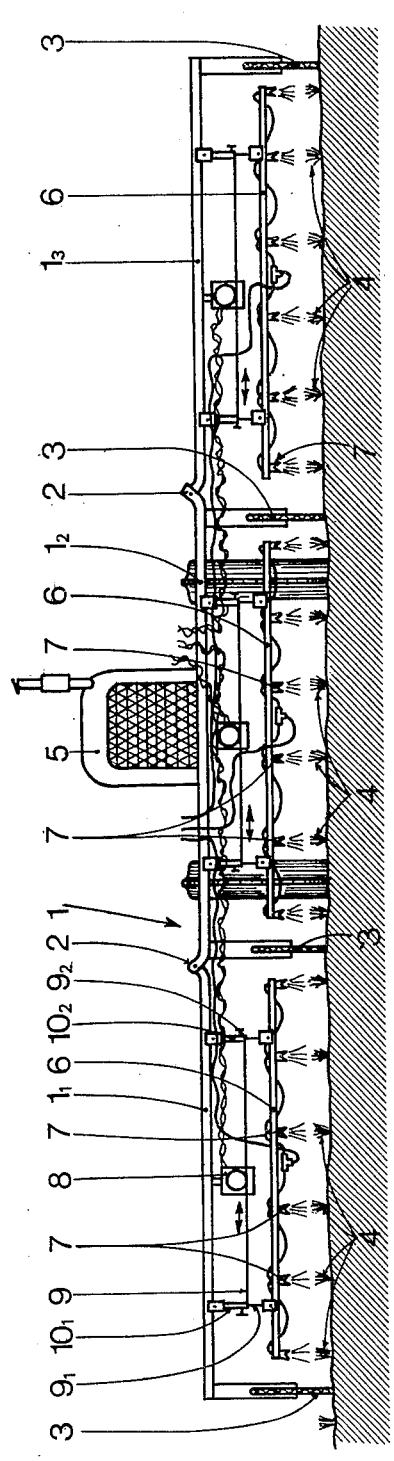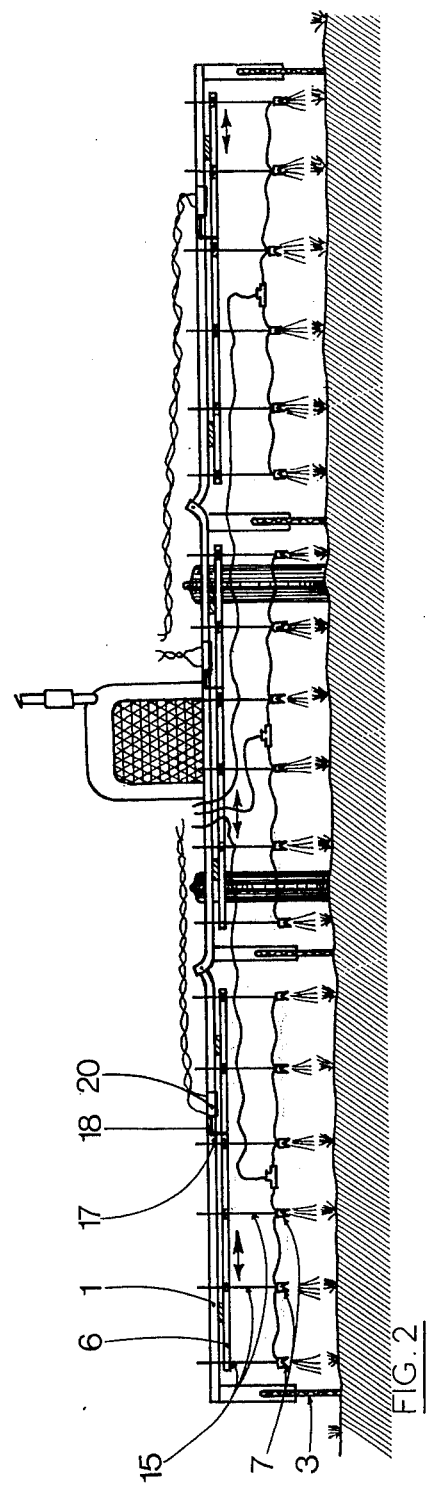

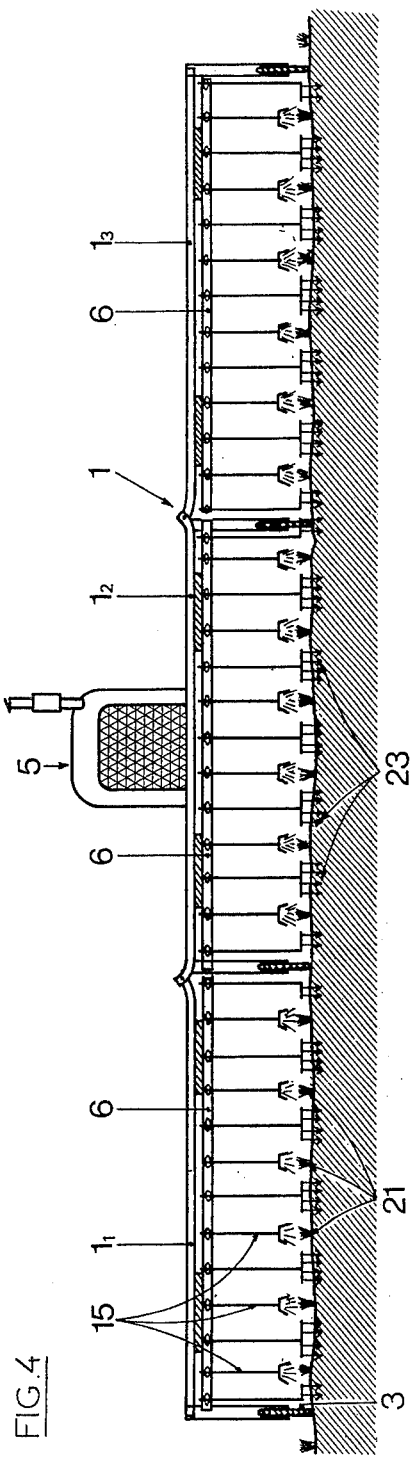
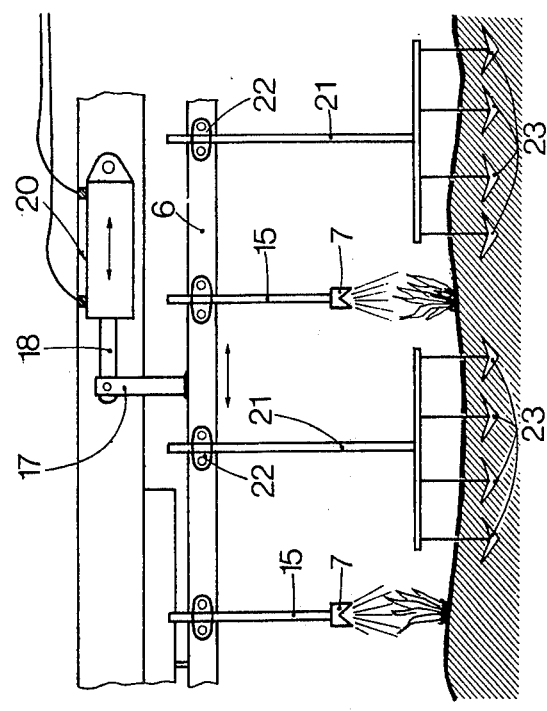
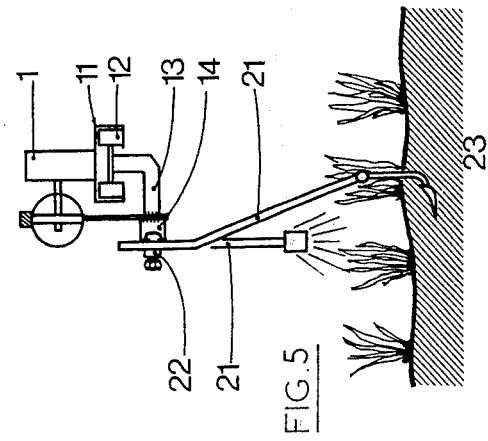

MOBILE AGRICULTURAL SPRAY MACHINE

BACKGROUND OF THE INVENTION

The present invention relates to an agricultural powder spraying machine, e.g., a mobile powder sowing apparatus attached to a tractor having a hopper containing the material to be sprayed, e.g., sown or spread out.

BRIEF DESCRIPTION OF THE PRIOR ART

Mobile spray and sowing machines of this type are known and consist of a spreading conduit fed by a series of spray nozzles or sowing heads, disposed along the ramp. These nozzles are fed simultaneously from a feed pipe coupled to the hopper. This type of powder spray or sowing machine using several spray passages has the defect that since the nozzles are separated by a fixed distance and the powder feed is located in several passages of the machine, the nozzles consequently cannot follow the misalignments of the rows of vegetables or plants so that defects are produced in the regularity of the spraying, e.g., since several plants are not treated.

Indeed, frequently two passes of the sowing machine are not rigorously parallel or further, by distraction of the driver, the spraying is not rectilinear so that as a result the rows of vegetables often are spaced apart a distance greater than the powder cone emitted by the nozzles. In this case the nozzles which correspond to the plants within the treating zone should, to be able to act on these plants, be individually adjusted and synchronized with the displacement speed of the tractor vehicle. In the absence of such a correction of the space between nozzles, a rather important fraction of the surface to be treated is left out.

Briefly, there is no sprayer material available which can operate in a width greater than that of the spraying machine.

OBJECT OF THE INVENTION

Thus, the object of the present invention is to remedy these various defects and contemplates a powder spray sowing arrangement which has several spraying passages, so disposed and arranged that all the vegetables and plants will be treated notwithstanding defects in parallel rows.

SUMMARY OF THE INVENTION

Generally speaking, the agricultural powder spraying, e.g., sowing machine herein contemplated comprises an assembly having at least two moveable sections resting on the soil upon wheels, this assembly supporting at least two conduits having powder nozzles for the product to be sprayed. The conduits are laterally moveable, are suspended at the moving sections of the assembly and are provided with automatic adjusting means allowing individual modification of their lateral position perpendicular to the direction of travel of the tractor vehicle. Other means likewise allow adjustment of the height and spacing of the nozzles associated with each conduit.

According to one embodiment of the invention the automatic adjustment means for the conduits comprise a deformable quadrilateral having defined sides. Two of the sides are defined by the assembly and conduit, parallel thereto, respectively. The remaining two sides are defined by two moveable telescopic connecting rods which couple this assembly to the conduit.

According to one aspect of the invention this assembly in the form of a quadrilateral is fastened to a reversible motor wherein the output shaft has a drum on which a cable is wound in the one or the other direction. This cable is connected to the two telescopic connecting rods, the operation of the motor causing the angular displacement of the connecting rods with respect to the assembly and consequently the lateral displacement of the conduit holding the spraying nozzles.

According to another embodiment the means used to obtain a lateral displacement of the conduits are defined by a guide path having an inverted U-shaped cross-section wherein the wings are folded inwardly defining a slide path wherein sets of roller casters are located providing a side face. The casters are adjustably disposed in heigth and spaced apart and act as the supports for the nozzles. The guide path is attached to the assembly, and the side displacement of this side face being provided by a two-way vernier.

According to a further aspect of the invention each sowing conduit has, apart from the powder nozzles, tool-holders which are also adjustable in height.

The agricultural powder spraying, e.g., sowing machine according to the inventive concept will be better understood by the following detailed description, taken together with the accompanying drawings in which:

BRIEF DESCRIPTION OF THE DRAWINGS

FIG. 1 is a plan view of the spraying apparatus contemplated herein according to one embodiment thereof;

FIG. 2 shows a plan view of the spraying apparatus contemplated herein according to a second embodiment thereof;

FIGS. *3a* and *3b* present views of details shown in FIG. 2;

FIG. 4 illustrates a third embodiment contemplated; and,

FIGS. 5 and 6 present views of details shown in FIG. 4.

DETAILED DESCRIPTION

According to the inventive concept the spraying machine has an assembly 1 with two or more moveable sections $1_1$, $1_2$, $1_3$ joined by axles or pivots 2.

In the example given there are three sections in an inverted U-shape wherein the branches are supported by wheels 3 resting on the soil. In this manner, the assembly and more particularly the sections which form it can cover the rows of vegetables 4. This assembly is much larger than the customary sowing machine so that it is possible to simultaneously treat a large variety of vegetables. The assembly is attached to a tractor vehicle 5 and thus moves only in the forward direction of this vehicle. This assembly supports spreading conduit 6 which is suspended in a direction perpendicular to each section of the assembly, these ramps being equipped with spray tubes 7, fed by the powder spray material by a hopper (not shown) carried by the tractor. The spray heads are disposed along the entire length of the spray conduits at an interval corresponding to the usual interval between rows of vegetables.

These spray conduits are independent from one another and are laterally moveable, i.e., moveable in a direction perpendicular to the travel direction of the vehicle in such a manner that the operator can from his own seat, with the use of a reversible commutator (not shown), correct the position of the spray tubes 7 relative to the rows of vegetables 4, particularly when he sees a defect in the parallel arrangement between rows and that this defect can be injurious to the treatment of these vegetables. The lateral adjustment of the spray conduit 6 is obtained according to the first embodiment (FIG. 1) by using a reversible motor 8 having a drum on which a cable 9 is wound in the one or the other direction. The two ends $9_1$ and $9_2$ are tied to the two ends of each spray conduit 6.

According to this embodiment the adjusting means which causes the lateral displacement of the spray conduit consist of an assembly having a deformable quadrilateral shape wherein the sides are defined by assembly $1_1$, $1_2$ or $1_3$, one of the conduits 6 and two connecting rods $10_1$ and $10_2$, the latter of which form the lateral sides of the quadrilateral and connect the sections of the assembly with the spray conduits. Thus, the rolling arc of the cable 9 in one or the other direction determines the deformation in the opposite direction of the quadrilateral so that the conduit in question is moved laterally with regard to the fixed assembly. This arrangement allows the faithful coincidence of the spray heads carried by a conduit channel under consideration with the rows of vegetables 4, even if the rows have a defect in parallelism because of an irregularity in sowing.

Figure 3A:
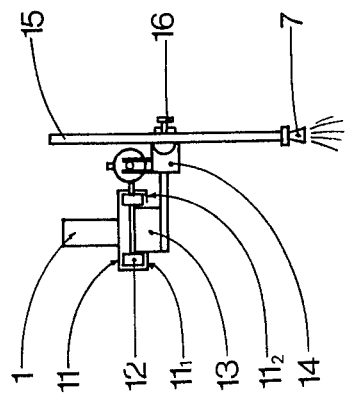

It is also possible (FIG. 2) to regulate the spray conduits 6 by means of a pneumatic or hydraulic arrangement. This system is illustrated in FIGS. 2, 3a, and 3b showing the assembly 1 as a unit with a guide path 11 along which rolls a train of casters 12 from which is suspended a side support 13 on which spray heads or tubes 7 are disposed. The guide path 11 appears in an inverted U-shape in cross-section, wherein the wings are internally folded to define glide paths along which roll the casters 12 on which the support 13 is suspended sideways. This support 13 supports the side member 14 on which are disposed in relative positions the supports for tube 15 which can thus be regulated in space and height simply by unscrewing and screwing of screw cap 16.

Side support 13 is integral having a rod 17 of piston 18 of a double vernier 19 wherein the cylinder 20 is integral with assembly 1. Thus, the path of piston 18 causes relative displacement in one or the other direction of spray conduits and, consequently of the powder spray nozzles. With this arrangement, these nozzles can be thus regulated laterally by moving the spray ramps or in space and height by moving side 14.

According to another embodiment, the spray conduits 6 include a tool carrier 21 (FIG. 6) attached like the powder nozzles 7 on conduits 6. These tool carriers are mounted along the conduit either together with or alternately with nozzles 7. If they are alternately mounted these tool carriers 21 are situated in a space between two contiguous nozzles 7 in such a manner that the tools can work the soil in the zone between two rows of vegetables 4. In case the tool carriers are mounted together with nozzles 7, the tools 23 will work the same land, in one case, found between two rows of vegetables, in the case of a chemical tilling of the soil, or which can be the actual row of the vegetable in another case. Tool carriers 21 are provided on moving supports and are held fast in caps 22 similar to those in which are mounted the supports for the powder nozzles 15, so that they are very like the nozzles, adjustable in height and spacing, the tool carriers 21 have known components to which are affixed different tools depending on whether it is desired to weed, till or carry out other similar operations.

Thus, the tool carriers 21 are like the spray nozzles 7 adjustable in height and integral with the spray conduits 6, laterally adjustable so that it is possible to simultaneously carry out the treatment of vegetables and work the soil during the same pass of the sowing apparatus.

It is finally possible because of the removability of tools 23 to change tools or eliminate them if the sowing apparatus is to be used alone. On the other hand, it is also possible to interrupt the spraying and use the machine as a simple work tool for the soil all the while being able to displace individually each conduit supporting tool.

The present invention permits the treatment of vegetables and working of soil on a scale larger than the width of the sowing apparatus with which the sowing was carried out which permits one to gain an appreciable amount of time.

It is possible therefore to work several widths of sowing terrain, in terrain which is irregular or sloping since the autonomy and mobility of each channel of the spray ramp with regard to the assembly permits this.

This invention naturally is not limited to the embodiment hereinbefore given but can be carried out in other forms or embodiments without departing from the spirit of the invention.

We claim:

1. In a powder spraying machine for agricultural use, a tractor vehicle having a powder hopper, a frame assembly with wheels including means to affix said powder hopper to said tractor vehicle, said frame assembly having at least two movable sections mounted on wheels; at least two spraying conduits with spray nozzles wherein said conduits are suspended from said assembly moveable sections, motorized adjusting means to permit individual lateral adjustment of each of said conduits, perpendicular to the direction of advance of the tractor vehicle wherein each of said conduits can be individually and laterally moved by said motorized adjusting means during the advance of said tractor and, further adjusting means for adjusting the height and separation of the spray nozzles of each said conduit.

2. A machine as claimed in claim 1 wherein said frame assembly comprises a deformable quadrilateral assembly wherein two sides are defined by a moveable section and a spray conduit which are parallel and the other two sides are defined by two moveable telescopic connecting rods joining said moveable section and said conduit.

3. A machine as claimed in claim 2 wherein said quadrilateral assembly is connected to said motorized adjustment means, said motorized adjustment means comprising a reversible motor with an output shaft, a drum mounted on said output shaft, a cable disposed around said drum and connected to said telescopic connecting rods, whereby the operation of said motor causes the angular displacement of the connecting rods relative to the moveable section and thus causes the lateral displacement of the conduits carrying the spray nozzles.

4. A machine as claimed in claim 3 wherein said moveable sections are inverse U-shaped to stand over the rows of vegetables and the spraying ramps are suspended perpendicularly under the moveable sections.

5. A machine as claimed in claim 1 wherein said motorized adjusting means to adjust the spacing of the spray nozzles on each conduit comprises a guide path with wings inwardly folded to form a glide path for roller casters, said casters having a side support connected to a side member on which are mounted spray nozzle supports adjustable in height and spacing, a piston and cylinder assembly comprising a piston rod connected to said side support, and a cylinder mounted on said moveable section whereby actuation of said piston and cylinder assembly provides lateral displacement of said conduit.

6. A machine as claimed in claim 5 wherein each spray nozzle support is displaceably mounted in a cap having a screw block for lateral and vertical adjustment relative to the soil.

7. A machine as claimed in claim 6 wherein the assembly has more than two sections, moveably fastened to one another, each supporting independent spray conduits.

8. A machine as claimed in claim 1 wherein the control of the individual or collective movement of the conduits during the displacement of the vehicle is carried out by a reversible commutator within reach of the driver on the vehicle seat.

9. A machine as claimed in claim 1 wherein each conduit has tool carriers adjustable in height and displacement.

10. A machine as claimed in claim 9 wherein said tool carriers are located together with the spray nozzles along the entire length of the conduits and are then laterally adjustable perpendicular to the tractor vehicle during the work performance.

11. A machine as claimed in claim 9 wherein said tool carrier comprises fixed rods held by a bolted cap affixed to the spray nozzles.

12. A machine as claimed in claim 9 wherein said tool carriers carry sowing tools.

13. A machine as claimed in claim 5 wherein said motorized adjusting means further comprises a two way vernier.

* * * * *